United States Patent
Slayne et al.

(10) Patent No.: US 9,074,637 B2
(45) Date of Patent: Jul. 7, 2015

(54) TOLERANCE RING WITH WAVE STRUCTURES HAVING DISCONNECTED ENDS

(71) Applicant: Saint-Gobain Performance Plastics Rencol Limited, Coventry (GB)

(72) Inventors: Andrew R. Slayne, Frampton Cotterell (GB); Llewelyn Pickering, Clydach Monmouthshire (GB)

(73) Assignee: SAINT-GOBAIN PERFORMANCE PLASTICS RENCOL LIMITED, Coventry (GB)

( * ) Notice: Subject to any disclaimer, the term of this patent is extended or adjusted under 35 U.S.C. 154(b) by 0 days.

(21) Appl. No.: 14/306,488

(22) Filed: Jun. 17, 2014

(65) Prior Publication Data

US 2015/0000098 A1     Jan. 1, 2015

Related U.S. Application Data

(60) Provisional application No. 61/840,351, filed on Jun. 27, 2013.

(51) Int. Cl.
*G11B 5/48* (2006.01)
*F16D 1/08* (2006.01)

(52) U.S. Cl.
CPC ......... *F16D 1/0835* (2013.01); *Y10T 29/49826* (2015.01); *Y10T 403/7051* (2015.01); *G11B 5/4813* (2013.01)

(58) Field of Classification Search
USPC ......... 360/265.4, 265.5, 265.6; 403/365, 371, 403/372
See application file for complete search history.

(56) References Cited

U.S. PATENT DOCUMENTS

| | | | | |
|---|---|---|---|---|
| 3,197,243 A * | 7/1965 | Brenneke | ...... | 403/372 |
| 3,838,928 A * | 10/1974 | Blaurock et al. | ...... | 403/372 |
| 4,286,894 A * | 9/1981 | Rongley | ...... | 403/372 |
| 4,828,423 A * | 5/1989 | Cramer et al. | ...... | 403/372 |
| 6,288,878 B1 * | 9/2001 | Misso et al. | ...... | 360/264.3 |
| 6,603,634 B1 * | 8/2003 | Wood et al. | ...... | 360/98.08 |
| 6,754,046 B2 * | 6/2004 | Barina et al. | ...... | 360/265.6 |
| 6,939,052 B1 * | 9/2005 | Hull | ...... | 384/535 |
| 7,554,771 B2 * | 6/2009 | Hanrahan et al. | ...... | 360/265.2 |
| 7,611,303 B2 * | 11/2009 | Hanrahan et al. | ...... | 403/372 |
| 7,850,389 B2 * | 12/2010 | Hanrahan et al. | ...... | 403/372 |
| 7,978,437 B2 * | 7/2011 | Hanrahan et al. | ...... | 360/265.6 |
| 8,052,406 B2 | 11/2011 | Li et al. | | |

(Continued)

FOREIGN PATENT DOCUMENTS

DE     29509851 U1     9/1995
EP     0748944 A2     12/1996

(Continued)

OTHER PUBLICATIONS

Machine English translation of EP 2532907A2, to Braun et al, published Dec. 12, 2012, 15 pages.*

(Continued)

*Primary Examiner* — Brian Miller
(74) *Attorney, Agent, or Firm* — Abel Law Group, LLP; Chi Suk Kim (57) ABSTRACT

A tolerance ring with a generally cylindrical body having a sidewall, wherein the sidewall includes an undeformed portion and a plurality of wave structures protruding from the undeformed portion. The wave structures each having a feature disconnected from the adjacent sidewall.

20 Claims, 11 Drawing Sheets

(56) References Cited

U.S. PATENT DOCUMENTS

| | | |
|---|---|---|
| 8,233,242 B2 * | 7/2012 | Court et al. .............. 360/265.6 |
| 8,282,308 B2 | 10/2012 | Slayne et al. |
| 8,385,024 B2 * | 2/2013 | Schmidt et al. .......... 360/265.6 |
| 2005/0225903 A1 * | 10/2005 | Sprankle et al. ......... 360/264.3 |
| 2006/0181811 A1 * | 8/2006 | Hanrahan et al. ........ 360/265.2 |
| 2008/0038090 A1 | 2/2008 | Figge et al. |
| 2008/0115357 A1 | 5/2008 | Li et al. |
| 2008/0247815 A1 | 10/2008 | Slayne et al. |
| 2011/0076096 A1 * | 3/2011 | Slayne et al. ............. 403/372 |
| 2012/0087044 A1 | 4/2012 | Schmidt et al. |
| 2013/0163912 A1 * | 6/2013 | Aparimarn et al. ........... 384/626 |

FOREIGN PATENT DOCUMENTS

| | | | |
|---|---|---|---|
| EP | 2532907 A2 | * | 12/2012 |
| JP | 2002130310 A | * | 5/2002 |
| WO | 2014207061 A1 | | 12/2014 |

OTHER PUBLICATIONS

International Search Report for PCT Application No. PCT/EP2014/063435 Dated Oct. 16, 2014.

* cited by examiner

TOLERANCE RING WITH WAVE STRUCTURES HAVING DISCONNECTED ENDS

CROSS-REFERENCE TO RELATED APPLICATION(S)

This application claims priority under 35 U.S.C. §119(e) to U.S. Patent Application No. 61/840,351 entitled "TOLERANCE RING WITH LOCKING FEATURE," by Andrew R. Slayne and Llewelyn Pickering, filed Jun. 27, 2013, which is assigned to the current assignee hereof and incorporated herein by reference in its entirety.

FIELD OF THE DISCLOSURE

The present disclosure relates to tolerance rings and assemblies incorporating tolerance rings.

RELATED ART

Tolerance rings are typically incorporated into assemblies in which the tolerance ring provides an interference fit between inner and outer components of an assembly. More particularly, a tolerance ring is generally deployed in a bore of an outer component with the inner component residing radially inside the tolerance ring.

A tolerance ring may be sandwiched between a shaft that is located in a corresponding bore formed in a housing, and can act as a force limiter to permit torque to be transmitted between the shaft and the housing. The use of a tolerance ring accommodates variations in the diameter of the inner and outer components while still providing interconnection between the components.

Tolerance rings provide a cost-effective means of providing an interference fit between parts that may not be machined to exact dimensions. Tolerance rings have a number of other potential advantages, such as compensating for different linear coefficients of expansion between the parts, allowing rapid apparatus assembly, and durability.

Typically, a tolerance ring comprises a band of resilient material, e.g. a metal such as spring steel, the ends of which are brought towards one another to form a ring. A plurality of projections extends radially from the ring radially outwardly and/or inwardly. The projections can be formations, possibly regular formations, such as corrugations, ridges, waves or fingers. The band thus comprises an unformed region from which the projections extend, e.g. in a radial direction. There may be one or more rows (extending circumferentially) and/or columns (extending axially) of projections.

Although tolerance rings usually comprise a strip of resilient material that is curved to allow the easy formation of a ring, a tolerance ring may also be manufactured as an annular band. The term "tolerance ring" as used hereafter includes both types of tolerance rings.

In use, the tolerance ring is located between the components, e.g. in the annular region between the shaft and bore in the housing, such that the projections are compressed between the inner and outer components. Typically, all of the projections extend either inwardly or outwardly so that one of the inner and outer component abuts projections and the other abuts the unformed region. Each projection acts as a spring and exerts a radial force against the components, thereby providing an interference fit between them. Rotation of the inner or outer component will produce similar rotation in the other component as torque is transmitted by the ring. Likewise, a linear movement of either component will produce similar linear movement in the outer component as linear force is transmitted by the ring.

If forces (rotational or linear) are applied to one or both of the inner and outer components such that the resultant force between the components is above a threshold value, the inner and outer components can move relative to one another, i.e., the tolerance ring permits them to slip.

During assembly of apparatus with an interference fit between components, a tolerance ring is typically held stationary with respect to a first (inner or outer) component whilst a second component is moved into mating engagement with the first component, thereby contacting and compressing the projections of the tolerance ring to provide the interference fit. The amount of force required to assemble the apparatus may depend on the stiffness of the projections and the degree of compression required. Likewise, the load transmitted by the tolerance ring in its final position and hence the amount of retention force provided or torque that can be transmitted may also depend on the size of the compression force and the stiffness and/or configuration of the projections.

BRIEF DESCRIPTION OF THE DRAWINGS

Embodiments are illustrated by way of example and are not limited in the accompanying figures.

The use of the same reference symbols in different drawings indicates similar or identical items.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the tolerance ring art.

The concepts are better understood in view of the embodiments described below that illustrate and do not limit the scope of the present invention. The following description is directed to tolerance rings, and particularly, to tolerance rings that can substantially prohibit slip between an inner and outer component during the application of torque. In one aspect, a tolerance ring can be fitted around an inner component and then an outer component can be installed around the tolerance ring. Alternatively, the tolerance ring can be inserted into the second component and the inner component can be inserted through the tolerance ring.

In a typical tolerance ring, the tolerance ring can provide an interference fit between an inner and an outer component. As such, the inner and outer components can be statically coupled and can rotate together. If a torque between the inner and outer component becomes greater than the force of the interference fit, the inner and outer components can rotate with respect to each other. When the torque between the inner and outer components falls below the force of the tolerance fit, the two parts can re-engage each other.

A tolerance ring according to one or more of the embodiments described herein can include a plurality of projections that extend radially inward our outward from the body of the tolerance ring. The tolerance ring can be installed over a shaft. An outer component with a bore can then be installed around the tolerance ring causing detached components of the tolerance ring to deflect inward towards the shaft, biting into the outer surface of the shaft. As such, the tolerance ring can exhibit enhanced radial and axial gripping characteristics.

In a particular aspect, a tolerance ring according to one or more of the embodiments described herein can be installed within a compressor assembly between a main frame and compressor housing, a lower frame and a compressor housing, a stator and a compressor housing, or a combination thereof. In one aspect, a tolerance ring can be fitted around an inner component (e.g., the main frame, the lower frame, the stator, etc.) and then, an outer component can be engaged around the tolerance ring.

Figure 1:
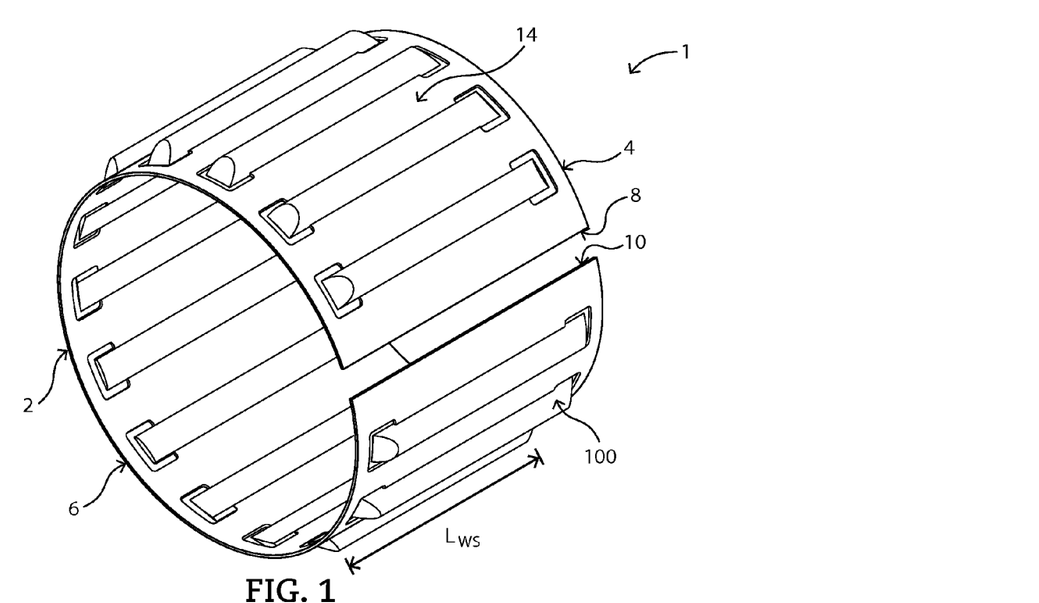
FIG. 1 illustrates a perspective view of a tolerance ring in accordance with an embodiment.

Referring initially to FIG. 1, a tolerance ring 1 is shown. The tolerance ring 1 can include a strip of resilient material 2, e.g., spring steel, having opposite axial ends 4, 6, and circumferential ends 8, 10. The strip 2 can include an undeformed portion 14 and at least one row of wave structures 100. The wave structures 100 may be press-formed, e.g., stamped, into the strip 2. The wave structures 100 can have a length, $L_{WS}$, extending at least partially between the axial ends 4, 6. Each wave structure 100 can be substantially identical in size and shape to allow for even radial compression around the circumference of the tolerance ring 1. Alternatively, each wave structure 100 can have unique or dissimilar characteristics.

In a particular aspect, there can be a number of wave structures, $N_{WS}$, located peripherally around the tolerance ring 1. $N_{WS}$ can be at least 3, such as $N_{WS}$ is at least 4, at least 5, at least 6, at least 7, at least 8, at least 9, at least 10, at least 11, at least 12, at least 13, at least 14, at least 15, or even at least 16. $N_{WS}$ can be no greater than 40, such as not greater than 35, not greater than 30, not greater than 25, not greater than 20, not greater than 15, or even not greater than 10. $N_{WS}$ can also be within a range between and including any of the above described values.

Figure 2:
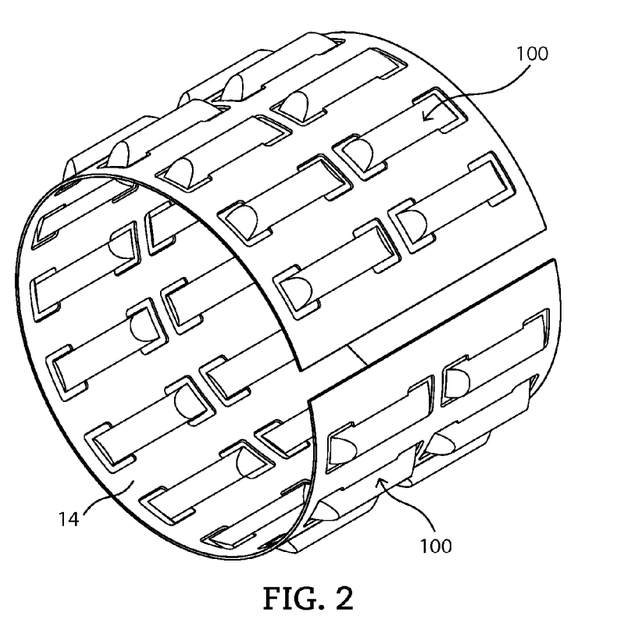
FIG. 2 illustrates a perspective view of a tolerance ring having multiple rows of projections in accordance with an embodiment.

Further, as depicted in FIG. 2, each wave structure 100 can include a number of rows (extending circumferentially), $N_{SWS}$, of smaller wave structures 100. $N_{SWS}$ can be at least 2, such as $N_{SWS}$ at least 3, or even at least 4. $N_{SWS}$ can be no greater than 6, such as $N_{SWS}$ is not greater than 5, is not greater than 4, or even is not greater than 3. $N_{SWS}$ can also be within a range between and including any of the above described values.

In this aspect, it should be understood that all reference to wave structures 100 herein can include either a single wave structure 100, as shown in FIG. 1, or any number of wave structures, $N_{SWS}$, within the range defined above, or as shown in FIG. 2. It should be further understood that each wave structure 100 can have either identical or varying dimensional and physical characteristics. In a particular aspect, the wave structures 100 can vary in shape and dimensional size around the circumference of the tolerance ring 1. In another aspect, all of the wave structures 100 can be substantially identical.

Figure 3:
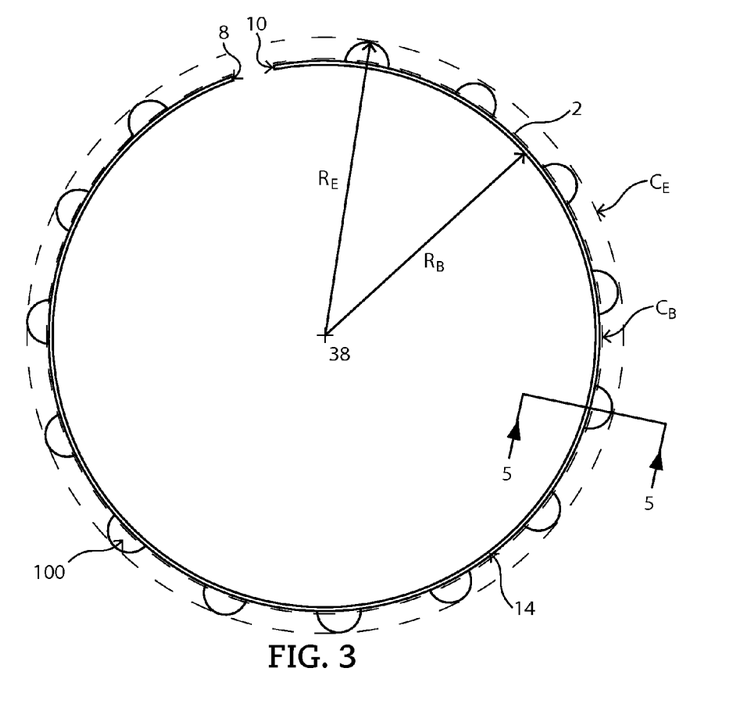
FIG. 3 illustrates a top view of a tolerance ring in accordance with an embodiment.

Referring to FIG. 3, the strip 2 can be curved to form an annular ring by bringing circumferential ends 8, 10 towards one another. Additionally, the strip 2 can be curved to form an overlap between ends 8 and 10 to increase the dimensional range that the ring 1 can accommodate. The resulting tolerance ring 1 has a center point 38, and an outer circumference, $C_B$, as measured along the outer surface of the undeformed portion 14.

The tolerance ring 1 can further comprise an effective circumference, $C_E$, as defined by a circle 36 tangent to the outermost radial surfaces of the wave structures 100. A ratio of $C_E:C_B$ can be at least 1.025, at least 1.05, at least 1.1, at least 1.2, at least 1.3, at least 1.4, at least 1.5, at least 1.75, or even at least 2.0. The ratio of $C_E:C_B$ can be less than 5, less than 4, less than 3, less than 2, or even less than 1.5. The ratio of $C_E: C_B$ can also be within a range between and including any of the ratio values described above.

In a particular aspect each wave structure 100 can have an arcuate cross-section with an outer apex 40. The wave structures define an effective radius, $R_E$, measured perpendicular from the center 38 of the ring 1 to an outer surface of the apex 40. The ring 1 can also have a base radius, $R_B$, measured perpendicular from the center 38 of the ring 1 to the outer surface of the undeformed portion 14. The radial height of each wave structure 100 is defined by the difference between $R_E$ and $R_B$.

Further, a ratio of $R_E:R_B$ can be at least 1.01, such as at least 1.05, at least 1.1, at least 1.15, at least 1.2, at least 1.25, at least 1.3, at least 1.35, at least 1.4, or at least 1.45. The ratio of $R_E:R_B$ is no greater than 1.9, such as no greater than 1.85, no greater than 1.8, no greater than 1.75, no greater than 1.7, no greater than 1.65, no greater than 1.6, no greater than 1.55, no greater than 1.5, no greater than 1.45, or no greater than 1.4. The ratio of $R_E:R_B$ can also be within a range between and including any of the ratio values described above.

The tolerance ring 1 can have wave structures 100 extending radially outward from the undeformed portion 14. The wave structures 100 can be partially disconnected from the undeformed portion 14. Disconnecting portions of the wave structure 100 from the undeformed portion 14 can function to enhance radial grip of an inner component 200. Enhanced grip or engagement with the inner component may be facilitated by providing increased radial deflection of the disconnected portions of the wave structures 100. In addition, the disconnect between the wave structures 100 and the undeformed portion 14 can introduce at least one finite edge surface 30 which can contacts and dig into the inner component 200. As a result, the tolerance ring 1 can exhibit increased gripping strength over other tolerance rings devoid of disconnected wave portions.

Figure 4A:
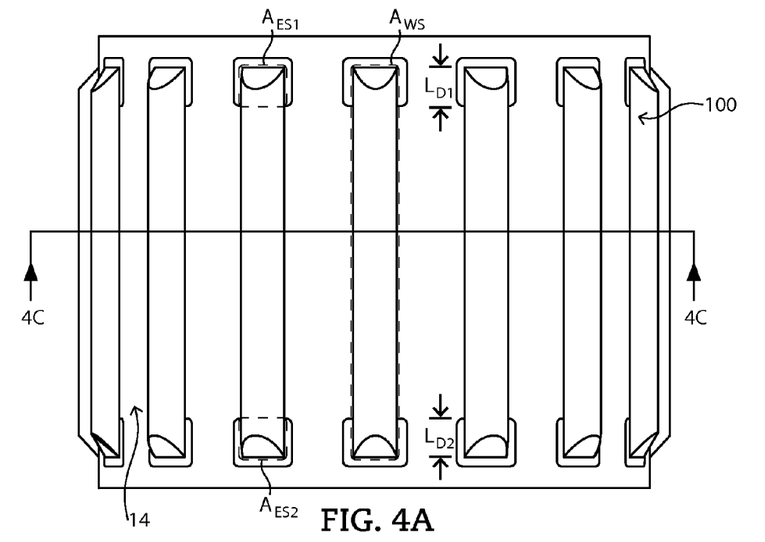
FIG. 4A illustrates a side plan view of a tolerance ring in accordance with an embodiment.
Figure 4B:
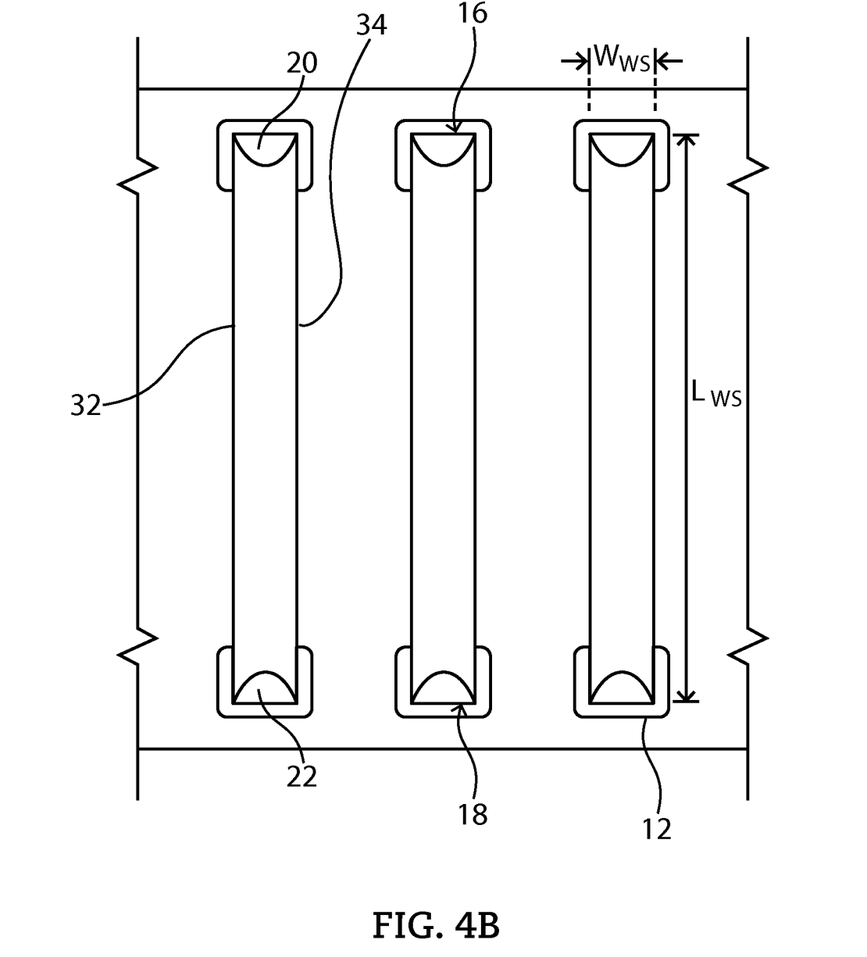
FIG. 4B illustrates an enlarged side plan view of a tolerance ring in accordance with an embodiment.
Figure 4C:
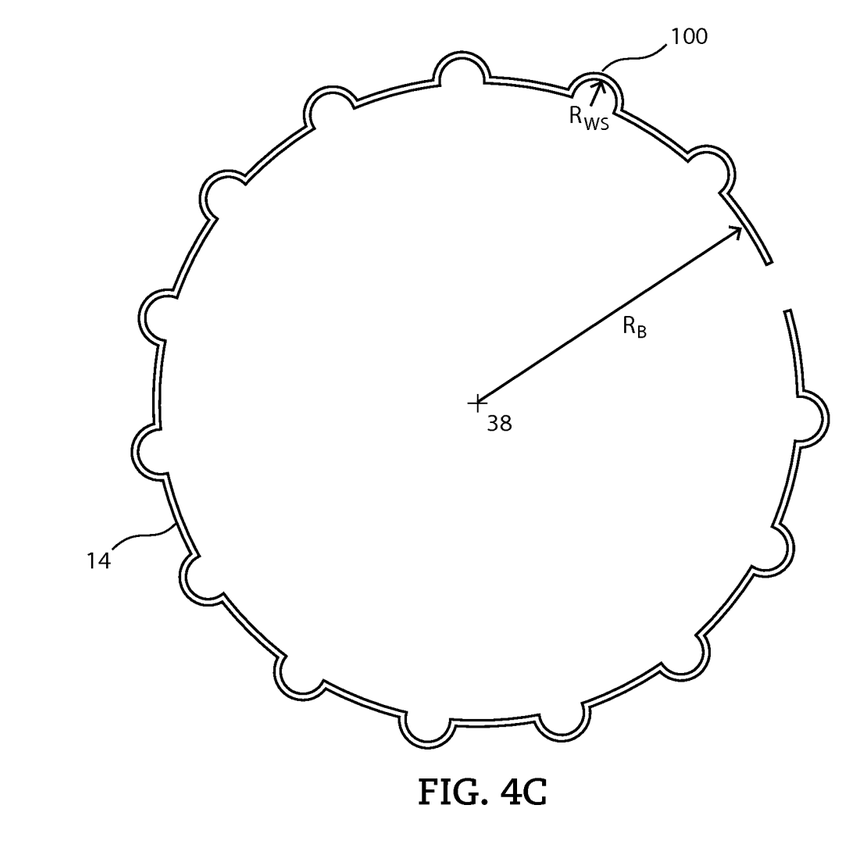
FIG. 4C illustrates a top cross-sectional view of a tolerance ring in accordance with an embodiment as taken along line 4C-4C in FIG. 4A.

As shown in FIG. 4A, FIG. 4B, and FIG. 4C, each wave structure 100 can include a first and second opposite axial end 16, 18. The axial ends 16, 18 of the wave structures 100 can each have an end face 20, 22 defined by a width, $W_{WS}$. The wave structures 100 can also have a longitudinal length, $L_{WS}$, as measured between the end faces 20 and 22. A ratio of $L_{WS}:W_{WS}$ can be at least 1, at least 2, at least 3, at least 4, at least 5, at least 10, or even at least 20. The ratio of $L_{WS}:W_{WS}$ can be no greater than 100, no greater than 75, no greater than 50, no greater than 25, no greater than 20, no greater than 15, no greater than 10, or even no greater than 5. The ratio of $L_{WS}:W_{WS}$ can also be within a range between and including any of the ratio values described above.

Further, a ratio of $W_{WS}:C_B$ can be less than 0.25, such as less than 0.2, less than 0.15, less than 0.1, less than 0.05, or less than 0.04. The ratio of $W_{WS}:C_B$ can be greater than 0.01, such as greater than 0.02, greater than 0.03, greater than 0.04, greater than 0.05, greater than 0.1, or even greater than 0.15. The ratio of $W_{WS}:C_B$ can also be within a range between and including any of the ratio values described above.

In a particular aspect, as $W_{WS}$ increases, $N_{WS}$ decreases. In another aspect, as $W_{WS}$ increases, $C_B$ increases. In yet another aspect, as $W_{WS}$ increases the distance of the unformed portion between the waves, $D_{UP}$, as measured between a first longitudinal side 32 of a first wave structure 100 and a second longitudinal side 34 of a second wave structure 100, decreases. Alternatively, as $W_{WS}$ decreases, $N_{WS}$ increases. In another aspect, as $W_{WS}$ increases, $C_B$ decreases. In yet another aspect, as $W_{WS}$ increases, $W_{UP}$ increases.

In a particular aspect, the wave structure 100 has a base footprint area, $A_{WS}$, as defined by the area between the first and second longitudinal sides 32, 34 and the end faces 20, 22. The end section 16 can have a footprint area, $A_{ES1}$, as defined by the area within $L_{D1}$ and $W_{WS}$. The end section 18 can have a footprint area, $A_{ES2}$, as defined by the area within $L_{D2}$ and $W_{WS}$.

In a particular aspect, a ratio of $A_{ES1}:A_{WS}$ can be less than 0.3, such as less than 0.25, less than 0.2, less than 0.15, less than 0.1, less than 0.05, less than 0.04, or even less than 0.03. The ratio of $A_{ES1}:A_{WS}$ can be at least 0.01, such as at least 0.02, at least 0.03, at least 0.04, at least 0.05, at least 0.1, at least 0.15, or even at least 0.2. The ratio of $A_{ES1}:A_{WS}$ can also be within a range between and including any of the ratio values described above.

Similarly, a ratio of $A_{ES2}:A_{WS}$ can be less than 0.3, such as less than 0.25, less than 0.2, less than 0.15, less than 0.1, less than 0.05, less than 0.04, or even less than 0.03. The ratio of $A_{ES2}:A_{WS}$ can be at least 0.01, such as at least 0.02, at least 0.03, at least 0.04, at least 0.05, at least 0.1, at least 0.15, or even at least 0.2. The ratio of $A_{ES2}:A_{WS}$ can also be within a range between and including any of the ratio values described above.

In a particular embodiment, $A_{ES1}$ can be equal to $A_{ES2}$. Equal dimensional areas $A_{ES1}$ and $A_{ES2}$ can facilitate enhanced performance.

Figures 5A, 5B:
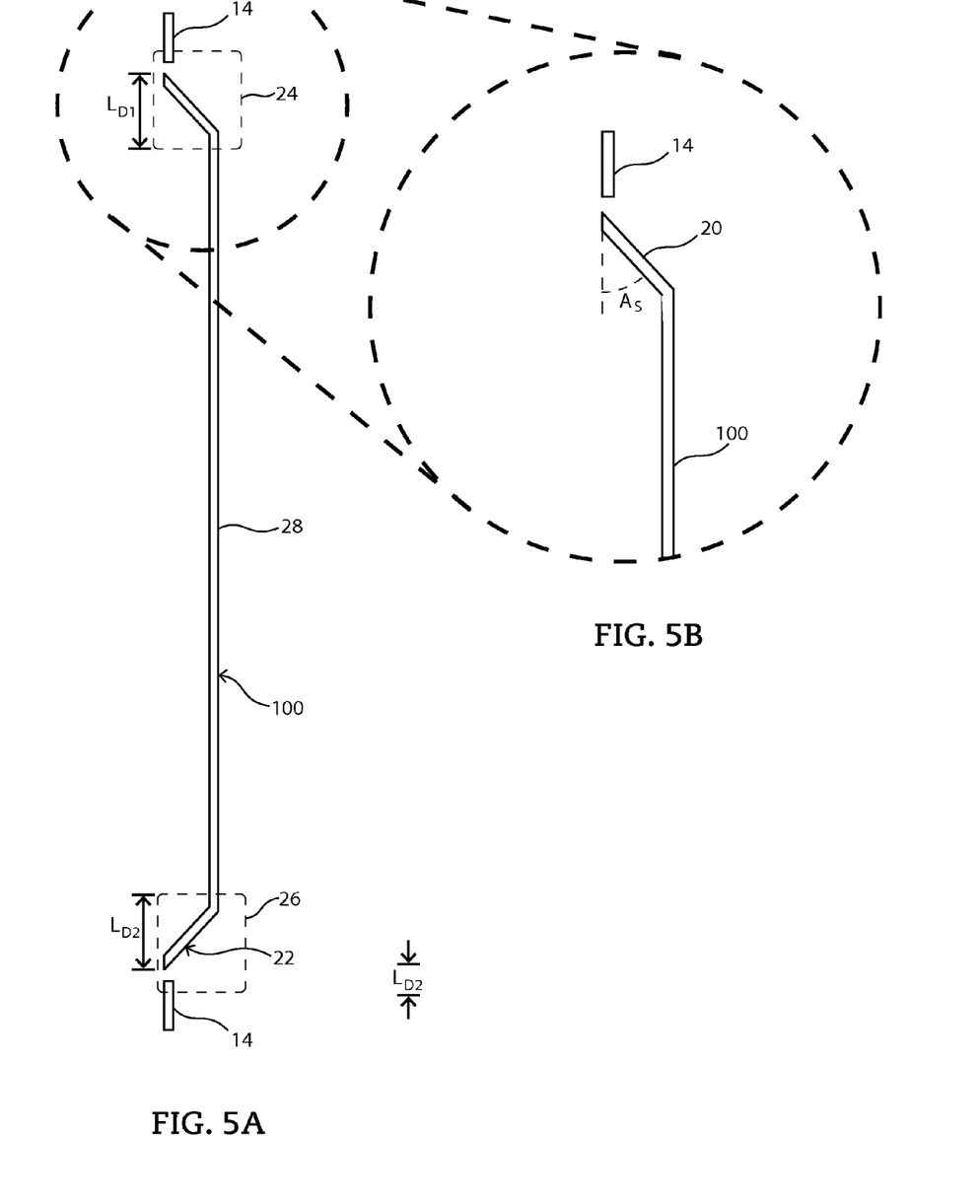
FIG. 5A illustrates a cross-sectional side view of a tolerance ring in accordance with an embodiment as taken along line 5-5 in FIG. 3.
FIG. 5B illustrates an enlarged cross-sectional side view of a tolerance ring in accordance with an embodiment as taken in FIG. 5A.

As illustrated in FIG. 5A and FIG. 5B, the end faces 20, 22 of the wave structures 100 can form a tapered surface having an angle, $A_S$, defined by the angle between the undeformed portion 14 and the surface of the end face 20, 22.

In a particular aspect, $A_S$ can be at least 20°, such as at least 30°, at least 40°, at least 50°, at least 60°, or even at least 70°. $A_S$ can be no greater than 90°, such as no greater than 85°, no greater than 80°, no greater than 70°, no greater than 60°, no greater than 50°, no greater than 40°, or even no greater than 30°. $A_S$ can also be within a range between and including any of the values described above. To the extent the tapered surface is not rectilinear (as viewed in cross section) and is arcuate, the angle is measured as the line tangent to the tapered surface at its midpoint and the central axis of the tolerance ring.

In one embodiment, each axial end 16, 18 of the wave structure 100 can include an end section 24, 26 disconnected from the undeformed portion 14. The end sections 24, 26 can have a disconnected length, $L_{D1}$ and $L_{D2}$, respectively, as measured along $L_{WS}$ from the end faces 20 and 22, respectively.

In particular, $L_{D1}$ can be no greater than 0.2 $L_{WS}$, such as no greater than 0.15 $L_{WS}$, no greater than 0.1 $L_{WS}$, no greater than 0.05 $L_{WS}$, no greater than 0.04 $L_{WS}$, no greater than 0.03 $L_{WS}$, or even no greater than 0.02 $L_{WS}$. $L_{D1}$ can be at least 0.01 $L_{WS}$, such as at least 0.02 $L_{WS}$, at least 0.03 $L_{WS}$, at least 0.04 $L_{WS}$, at least 0.05 $L_{WS}$, at least 0.1 $L_{WS}$, or even at least 0.15 $L_{WS}$. $L_{D2}$ can be no greater than 0.2 $L_{WS}$, such as no greater than 0.15 $L_{WS}$, no greater than 0.1 $L_{WS}$, no greater than 0.05 $L_{WS}$, no greater than 0.04 $L_{WS}$, no greater than 0.03 $L_{WS}$, or even no greater than 0.02 $L_{WS}$. $L_{D2}$ can be at least 0.01 $L_{WS}$, such as at least 0.02 $L_{WS}$, at least 0.03 $L_{WS}$, at least 0.04 $L_{WS}$, at least 0.05 $L_{WS}$, at least 0.1 $L_{WS}$, or even at least 0.15 $L_{WS}$.

In a particular embodiment, $L_{D1}$ can be equal to $L_{D2}$.

It may be desirable to have different values for $L_{D1}$ and $L_{D2}$ when certain slip torque conditions are required. Specifically, the deflection characteristics of the end sections 24, 26 can vary with the selected disconnected lengths, $L_{D1}$ and $L_{D2}$. A larger disconnected end section 24, 26 provides higher deflection characteristics and increased radial flexibility which enhances gripping properties of the tolerance ring 1.

Figure 6:
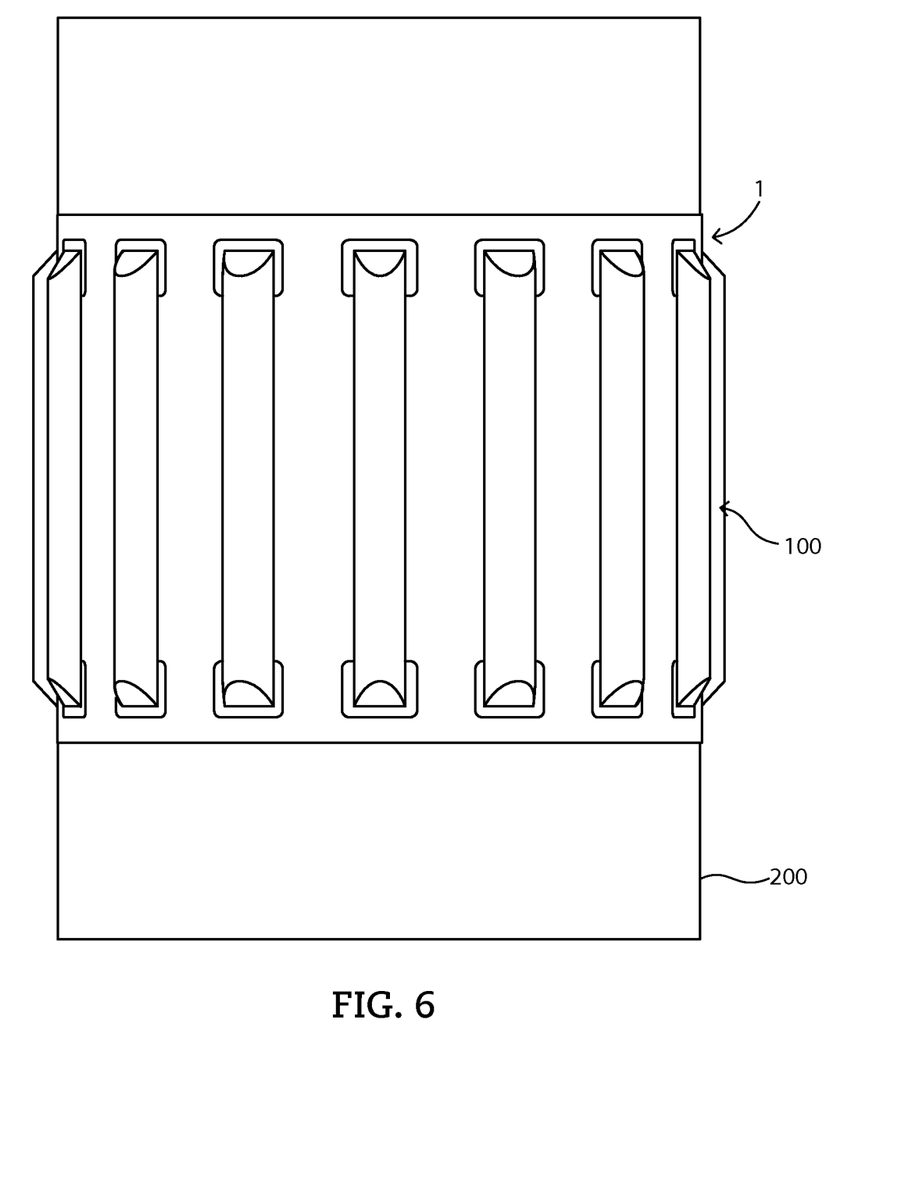
FIG. 6 illustrates a side plan view of tolerance ring engaged with an inner component in accordance with an embodiment.
Figure 7:
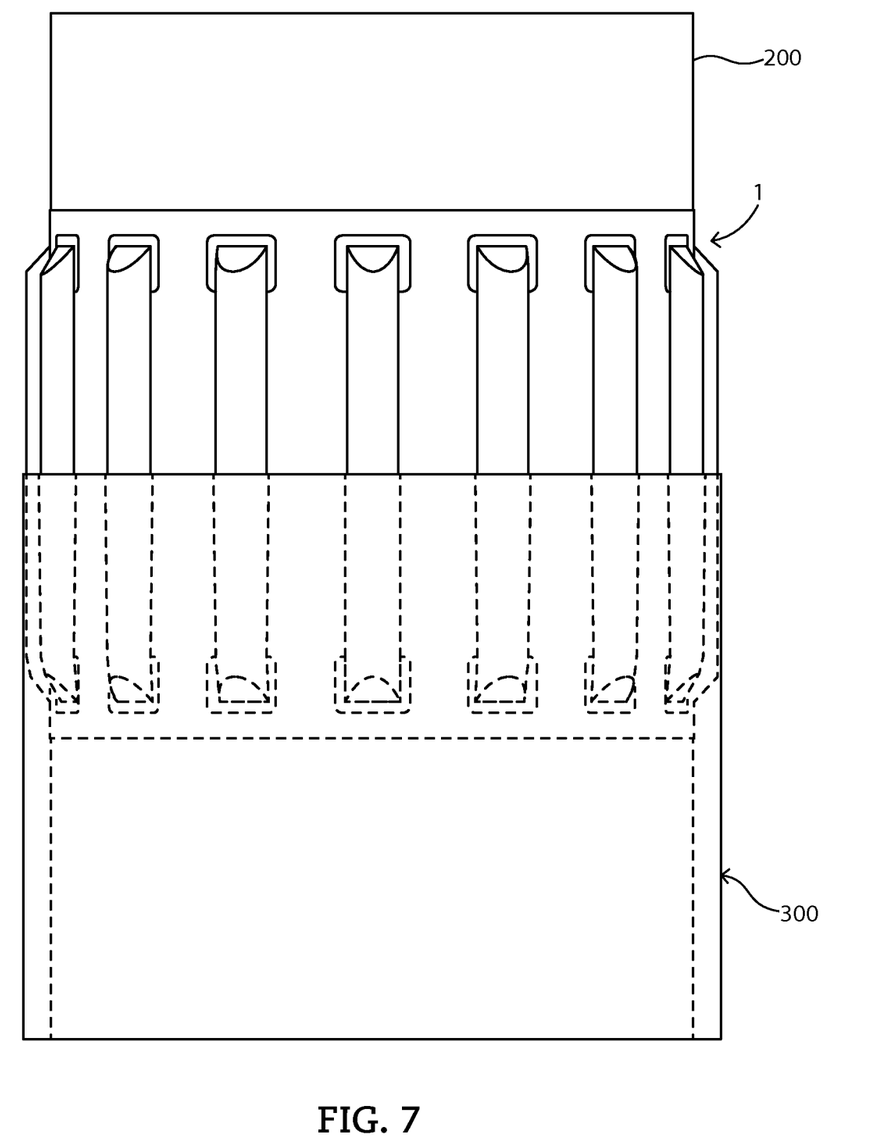
FIG. 7 illustrates a side plan view of a tolerance ring engaged with an inner component and partially engaged with an outer component in accordance with an embodiment.
Figure 8:
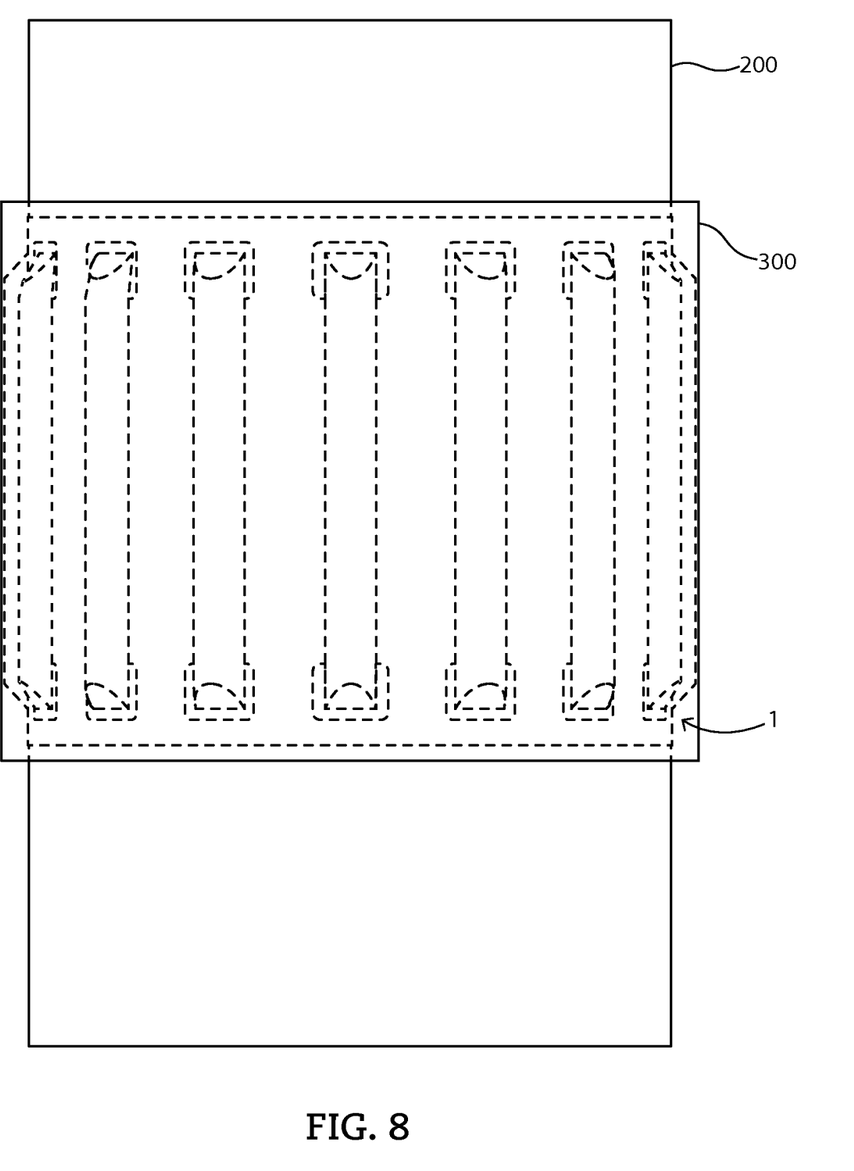
FIG. 8 illustrates a side plan view of a tolerance ring engaged with an inner and outer component in accordance with an embodiment.
Figure 9:
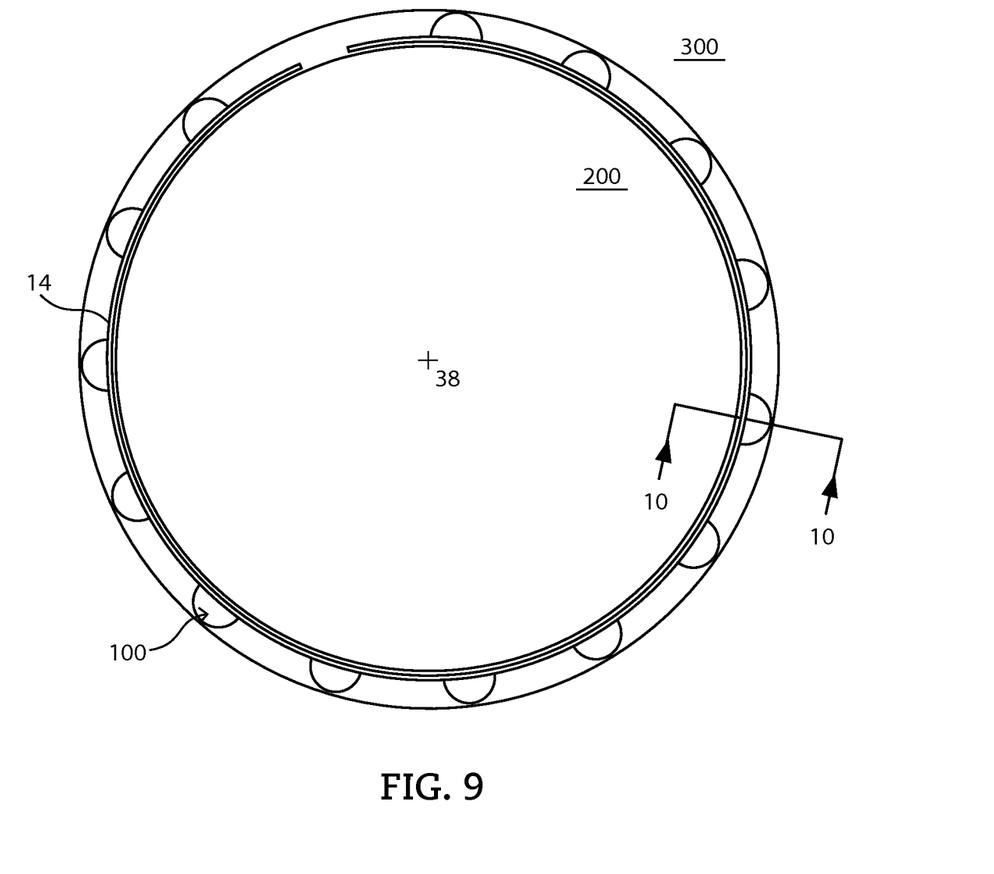
FIG. 9 illustrates a top view of a tolerance ring engaged with an inner and outer component in accordance with an embodiment.

As illustrated in FIG. 6, the tolerance ring 1 can be fitted around an inner component 200. The tolerance ring 1 can sit flush with the inner component 200 and the wave structures 100 can project radially outward. An outer component 300 can then be installed around the tolerance ring 1, as illustrated in FIG. 7, FIG. 8, and FIG. 9.

Figures 10A, 10B:
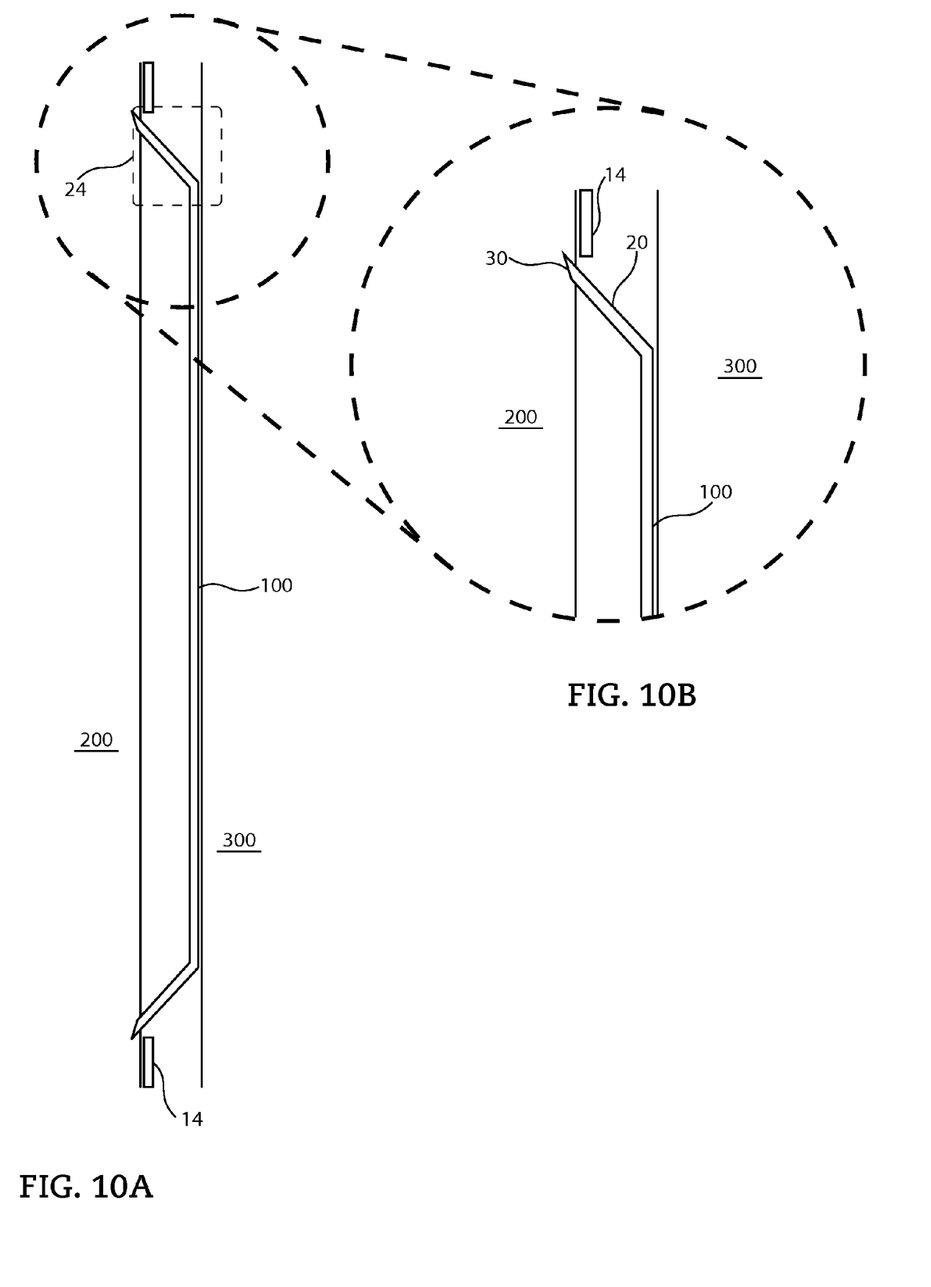
FIG. 10A illustrates a cross-sectional side view of a tolerance ring engaged with an inner and outer component in accordance with an embodiment as taken along line 10-10 in FIG. 9.
FIG. 10B illustrates an enlarged cross-sectional side view of a tolerance ring in accordance with an embodiment as taken in FIG. 10A.
Figure 11:
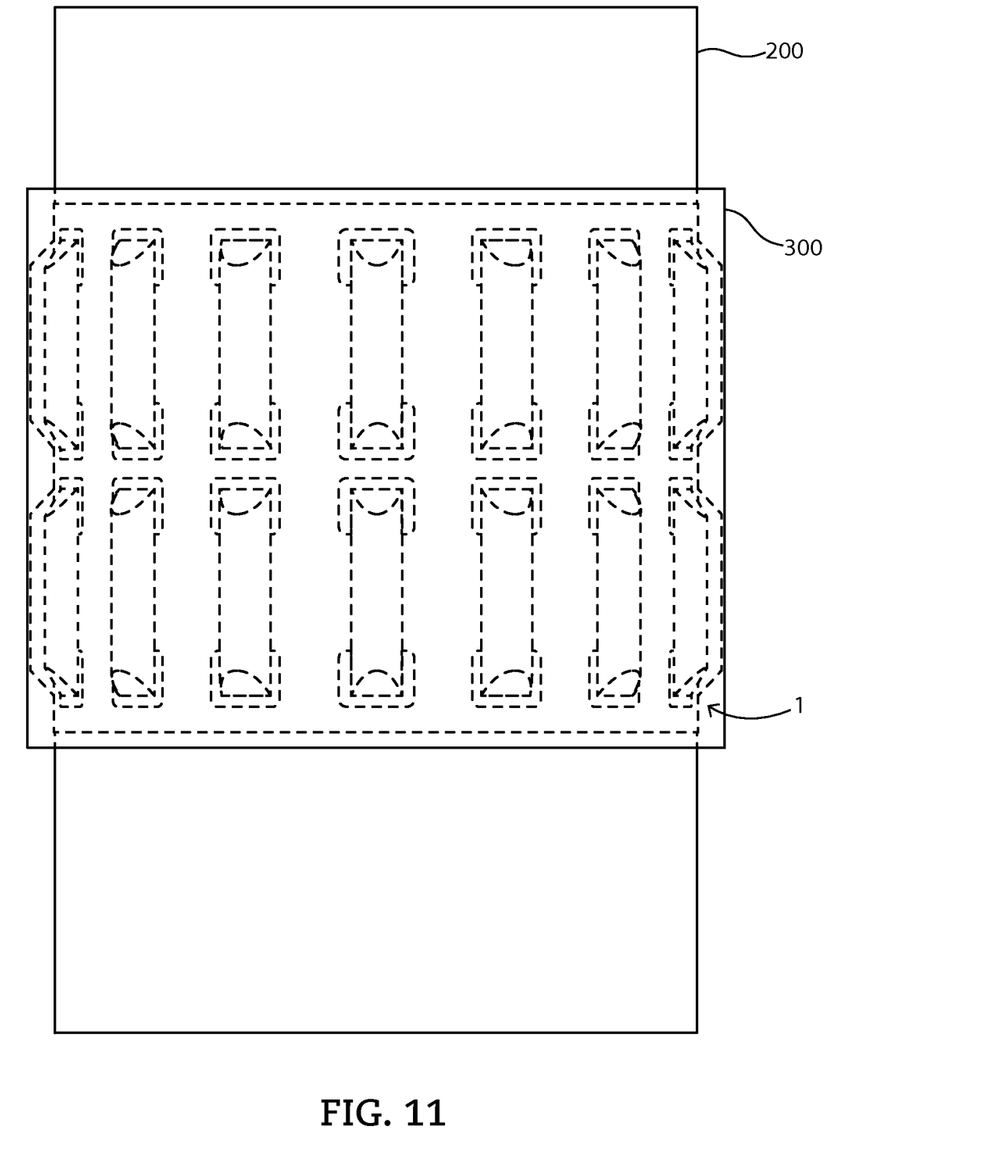
FIG. 11 illustrates a tolerance ring engaged with an inner and outer component in accordance with an embodiment.

Referring now to FIGS. 10A and 10B, the end sections 24, 26 can exhibit increased radial flexibility as compared to a middle section 28 of each wave structure 100. As a result, the end sections 24, 26 have enhanced inward deflection characteristics and can bite into the inner component 200, providing an enhanced grip therebetween. As shown in FIG. 5, the bite can be characterized in that the radial innermost face 30 of each end section 24, 26 gouges into the inner component 200 displacing material of the inner component 200 sufficiently to imbed the face 30 at least partially into the inner component 200. After the innermost faces 30 bite into the inner component 200 the required force to exhibit slip between the inner component 200 and the tolerance ring 1 increases. It is noted that the penetration of face 30 into material of the inner component 200 is exaggerated in FIG. 10A and 10B in order to clarify the described relationship between the face 30 and inner component 200.

In a particular aspect, the required force to exhibit slip between the inner component 200 and the tolerance ring 1 is dependent on the geometry and hardness of the innermost face 30, e.g., the angle, shape, thickness, and material of the innermost face 30 and the hardness of the inner component 200. Slip characteristics can be further controlled by material selection. In a particular embodiment, a relatively hard inner component 200, e.g., hardened steels, will exhibit increased resistance to inward biting of the innermost face 30. Alternatively, a relatively soft inner component 200, e.g., soft brass, will exhibit large displacement and biting caused by the innermost face 30.

In a particular embodiment, the tolerance ring 1 can include a Vickers pyramid number hardness, VPN, which can be no less than 350, such as no less than 375, no less than 400, no less than 425, or no less than 450. VPN can also be no greater than 600, no greater than 500, or no greater than 450. VPN can also be within a range between, and including, any of the VPN values described herein. In one particular embodiment, the inner component 200 can be made of a material having a $VPN_{IC}$ less than the tolerance ring $VPN_{TR}$, i.e. $VPN_{IC}$ is less than $VPN_{TR}$. Accordingly, the tolerance ring 1 can be made of a harder material than the inner component 200. As a result, the innermost faces 30 of the tolerance ring 1 can emboss indentations into the inner component 200 upon assembly.

In operation, the wave structures 100 are adapted to compress radially inward. As the center portion 28 of the wave structure 100 is compressed radially towards the center point 38 of the ring 1, the center portions 28 of the wave structures 100 deform inward, while the end sections 24, 26 deflect inward. This allows the tolerance ring 1 to compensate for radial imperfections in the diameter of the inner component 200 and the outer component 300 while simultaneously providing enhanced grip therebetween.

Referring again to FIG. 5A, the end sections 24, 26 can have disconnected lengths $L_{D1}$ and $L_{D2}$. These disconnected sections can allow for increased wave deflection which can enhance the gripping properties of the tolerance ring 1.

In a particular aspect, a ratio of $L_{D1}:L_{WS}$ can be no greater than 0.2, no greater than 0.19, no greater than 0.18, no greater than 0.17, no greater than 0.16, or even no greater than 0.15. Similarly, the ratio of $L_{D2}:L_{WS}$ can be no greater than 0.2, no greater than 0.19, no greater than 0.18, no greater than 0.17, no greater than 0.16, or even no greater than 0.15.

In another embodiment, the wave structure 100 can be disconnected from the undeformed portion 14 at least on one end.

Referring again to FIG. 4C, each wave structure 100 can have a radius of curvature, $R_{WS}$, that is less than the radius of curvature, $R_B$, of the undeformed portion 14 of the tolerance ring 1. $R_{WS}$ can be no greater than 0.9 $R_B$, no greater than 0.8 $R_B$, no greater than 0.7 $R_B$, no greater than 0.6 $R_B$, no greater than 0.5 $R_B$, no greater than 0.4 $R_B$, no greater than 0.3 $R_B$, or even no greater than 0.2 $R_B$. $R_{WS}$ can be at least 0.05 $R_B$, at least 0.1 $R_B$, at least 0.2 $R_B$, at least 0.3 $R_B$, at least 0.4 $R_B$, or even at least 0.5 $R_B$. In cases where the wave structures 100 have varying curvatures (e.g., parabolic shaped) the $R_{WS}$ is measured according to the best fit circle within the wave structure 100.

According to embodiments, a tolerance ring is provided that exhibits enhanced gripping capability over state of the art designs.

Typically, tolerance rings are selected to be slightly larger than the annular region into which they will be inserted. An inward radial compression of the wave structures 100 of less than 15%, such as less than 10%, may be suitable. In some embodiments a minimum of radial compression is specified, such as greater than 2%, greater than 4% or greater than 5%. One suitable working range is within 5% to 15%. Radial compression values as described can allow the ring to absorb axial irregularities while simultaneously providing enhanced slip limiting control.

The slip torque characteristics of the presently disclosed tolerance ring 1 can be measured against an identical tolerance ring, but devoid of disconnected portions (reference example). To perform a slip torque comparison, an embodiment herein and a reference example are deployed between identical inner and outer components at an identical loading (radial compression). For testing, radial compression is generally fixed at 7 or 8%.

In a particular aspect, the inner components can each be provided with identical torque loads that are increased until slip occurs. That torque is described as slip torque $T_S$. Embodiments provided enhanced the ratio of $T_S$ (embodiment) to $T_S$ (reference), such as not less than 1.01, 1.05, 1.10, 1.15, 1.20, 1.25, or 1.30. Increased slip torque ratio can have an upper limit, such as not greater than 1.50.

Many different aspects and embodiments of the tolerance rings are possible. Tolerance rings are not limited in light of the specific embodiments described herein.

Note that not all of the activities described above in the general description are required, that a portion of a specific activity may not be required, and that one or more further portions may be performed in addition to those described.

Item 1. A tolerance ring, comprising: a generally cylindrical body having a sidewall that defines a first axial end and a second axial end, wherein the sidewall includes: an undeformed portion; and a plurality of wave structures protruding from the undeformed portion, wherein each wave structure has a first and a second opposite axial end, and wherein the tolerance ring has at least one feature selected from the group consisting of:
 (i) each opposite axial end has an end section that is disconnected from the undeformed portion; or (ii) each wave structure has a first and a second longitudinal side, each longitudinal side having a total length, $L_{WS}$, and a disconnected length, $L_D$, defined by a disconnect between the first and second longitudinal sides and the undeformed portion as measured from a terminal end of the wave structure, wherein $L_D$ is less than 0.2 $L_{WS}$; or (iii) at least one axial end is disconnected from the undeformed portion and wherein a radius of curvature of the wave structure at the axial end, $R_{WS}$, is less than the radius of curvature of the body, $R_B$, such as $R_{WS}$ no greater than 0.9 $R_B$.

Item 2. An assembly, comprising: an outer component; an inner component; and the tolerance ring of claim 1 mounted between the inner component and the outer component.

Item 3. The tolerance ring or assembly of any one of the preceding items, further comprising a gap extending along the entire axial length of the body, wherein the gap establishes a split in the body.

Item 4. The tolerance ring or assembly of any one of the preceding items, wherein each wave structure further comprises: a first end face and a second end face, each end face having a width, $W_{EF}$, measured between the first and second longitudinal sides.

Item 5. The tolerance ring or assembly of any one of items 1-4, wherein the first and second longitudinal sides of a first end section are partially disconnected from the undeformed portion along a length, $L_{D1}$, measured from the first axial end of the wave structure along $L_{WS}$, and wherein the first and second longitudinal sides of a second end section are partially disconnected from the undeformed portion along a length, $L_{D2}$, measured from the second axial end of the wave structure along $L_{WS}$.

Item 6. The tolerance ring or assembly of item 5, wherein $L_{D1}$ is no greater than 0.20 $L_{WS}$, such as no greater than 0.15 $L_{WS}$, no greater than 0.10 $L_{WS}$, no greater than 0.05 $L_{WS}$, no greater than 0.04 $L_{WS}$, no greater than 0.03 $L_{WS}$, or no greater than 0.02 $L_{WS}$.

Item 7. The tolerance ring or assembly of any one of items 5 or 6, wherein $L_{D1}$ is no less than 0.01 $L_{WS}$, such as no less than 0.02 $L_{WS}$, no less than 0.03 $L_{WS}$, no less than 0.04 $L_{WS}$, no less than 0.05 $L_{WS}$, no less than 0.10 $L_{WS}$, or no less than 0.15 $L_{WS}$.

Item 8. The tolerance ring or assembly of any one of items 5-7, wherein $L_{D2}$ is no greater than 0.20 $L_{WS}$, such as no greater than 0.15 $L_{WS}$, no greater than 0.10 $L_{WS}$, no greater than 0.05 $L_{WS}$, no greater than 0.04 $L_{WS}$, no greater than 0.03 $L_{WS}$, or no greater than 0.02 $L_{WS}$.

Item 9. The tolerance ring or assembly of any one of items 5-8, wherein $L_{D2}$ is no less than 0.01 $L_{WS}$, such as no less than 0.02 $L_{WS}$, no less than 0.03 $L_{WS}$, no less than 0.04 $L_{WS}$, no less than 0.05 $L_{WS}$, no less than 0.10 $L_{WS}$, or no less than 0.15 $L_{WS}$.

Item 10. The tolerance ring or assembly of any one of items 5-9, wherein $L_{D1}$ is equal to $L_{D2}$.

Item 11. The tolerance ring or assembly of any one of items 1-10, wherein each wave structure comprises a circumferential width, $W_{WS}$, measured between the first and second longitudinal sides, and wherein $W_{WS}$ is no greater than 0.30 $L_{WS}$, such as no greater than 0.25 $L_{WS}$, no greater than 0.20 $L_{WS}$, no greater than 0.15 $L_{WS}$, no greater than 0.10 $L_{WS}$, or no greater than 0.05 $L_{WS}$.

Item 12. The tolerance ring or assembly of item 11, wherein $W_{WS}$ is no less than 0.02 $L_{WS}$, such as no less than 0.03 $L_{WS}$, no less than 0.04 $L_{WS}$, no less than 0.05 $L_{WS}$, no less than 0.10 $L_{WS}$, or no less than 0.15 $L_{WS}$.

Item 13. The tolerance ring or assembly of any one of items 11 or 12, wherein the body has an outer circumference, $C_B$, and wherein $W_{WS}$ is no greater than 0.25 $C_B$, such as no greater than 0.20 $C_B$, no greater than 0.15 $C_B$, no greater than 0.10 $C_B$, no greater than 0.05 $C_B$, or no greater than 0.04 $C_B$.

Item 14. The tolerance ring or assembly of item 13, wherein $W_{WS}$ is no less than 0.01 $C_B$, such as no less than 0.02 $C_B$, no less than 0.03 $C_B$, no less than 0.04 $C_B$, no less than 0.05 $C_B$, no less than 0.10 $C_B$, or no less than 0.15 $C_B$.

Item 15. The tolerance ring or assembly of any one of items 11-14, wherein the wave structure has a base area, $A_{WS}$, defined by the area within $L_{LS}$ and $W_{WS}$, wherein a first end section has an area, $A_{ES1}$, measured by the area within $L_{D1}$ and $W_{WS}$, and wherein a second end section has an area, $A_{ES2}$, measured by the area within $L_{D2}$ and $W_{WS}$.

Item 16. The tolerance ring or assembly of item 15, wherein $A_{ES1}$ is no greater than 0.30 $A_{WS}$, such as no greater than 0.25 $A_{WS}$, no greater than 0.20 $A_{WS}$, no greater than 0.15 $A_{WS}$, no greater than 0.10 $A_{WS}$, no greater than 0.05 $A_{WS}$, no greater than 0.04 $A_{WS}$, or no greater than 0.03 $A_{WS}$.

Item 17. The tolerance ring or assembly of any one of items 15 or 16, wherein $A_{ES1}$ is no less than 0.01 $A_{WS}$, such as no less than 0.02 $A_{WS}$, no less than 0.03 $A_{WS}$, no less than 0.04 $A_{WS}$, no less than 0.05 $A_{WS}$, no less than 0.10 $A_{WS}$, no less than 0.15 $A_{WS}$, or no less than 0.20 $A_{WS}$.

Item 18. The tolerance ring or assembly of any one of items 15-17, wherein $A_{ES2}$ is no greater than 0.30 $A_{WS}$, such as no greater than 0.25 $A_{WS}$, no greater than 0.20 $A_{WS}$, no greater than 0.15 $A_{WS}$, no greater than 0.10 $A_{WS}$, no greater than 0.05 $A_{WS}$, no greater than 0.04 $A_{WS}$, or no greater than 0.03 $A_{WS}$.

Item 19. The tolerance ring or assembly of any one of items 15-18, wherein $A_{ES2}$ is no less than 0.01 $A_{WS}$, such as no less than 0.02 $A_{WS}$, no less than 0.03 $A_{WS}$, no less than 0.04 $A_{WS}$, no less than 0.05 $A_{WS}$, no less than 0.10 $A_{WS}$, no less than 0.15 $A_{WS}$, or no less than 0.20 $A_{WS}$.

Item 20. The tolerance ring or assembly of any one of items 15-19, wherein $A_{ES1}$ is equal to $A_{ES2}$.

Item 21. The tolerance ring of any one of items 4-20, wherein each wave structure comprises an arcuate wave body extending between the first and second longitudinal sides.

Item 22. The tolerance ring or assembly of any one of items 1-21, wherein each wave structure comprises an outer apex with an apex radius, $R_A$, measured perpendicularly from a central axis of the ring to the outer surface of the apex, and a base radius, $R_B$, measured perpendicularly from the central axis of the ring to the outer surface of the undeformed portion, wherein $R_A$ is no less than 1.01 $R_B$, such as no less than 1.05 $R_B$, no less than 1.10 $R_B$, no less than 1.15 $R_B$, no less than 1.20 $R_B$, no less than 1.25 $R_B$, no less than 1.30 $R_B$, no less than 1.35 $R_B$, no less than 1.40 $R_B$, or no less than 1.45 $R_B$.

Item 23. The tolerance ring or assembly of item 22, wherein $R_A$ is no greater than 1.90 $R_B$, such as no greater than 1.85 $R_B$, no greater than 1.80 $R_B$, no greater than 1.75 $R_B$, no greater than 1.70 $R_B$, no greater than 1.65 $R_B$, no greater than 1.60 $R_B$, no greater than 1.55 $R_B$, no greater than 1.50 $R_B$, no greater than 1.45 $R_B$, or no greater than 1.40 $R_B$.

Item 24. The tolerance ring or assembly of any one of items 4-23, wherein each end face of the wave structure comprises a tapered surface, the tapered surface having an angle, $A_S$, defined by the angle between the undeformed portion and the surface of the tapered face, wherein $A_S$ is no less than 20 degrees, such as no less than 30 degrees, no less than 40 degrees, no less than 50 degrees, no less than 60 degrees, or no less than 70 degrees.

Item 25. The tolerance ring or assembly of item 24, wherein $A_S$ is no greater than 99 degrees, such as no greater than 95 degrees, no greater than 90 degrees, no greater than 80 degrees, no greater than 70 degrees, no greater than 60 degrees, no greater than 50 degrees, or no greater than 40 degrees.

Item 26. The tolerance ring or assembly of any one of items 4-25, wherein the sidewall of the ring has a total axial length, $L_R$, measured from the first axial end of the sidewall to the second axial end of the sidewall, and wherein $L_{LS}$ no greater than $L_R$.

Item 27. The tolerance ring or assembly of item 26, wherein $L_{LS}$ no greater than 1.00 $L_R$, such as no greater than 0.90 $L_R$, no greater than 0.80 $L_R$, no greater than 0.70 $L_R$, no greater than 0.60 $L_R$, or no greater than 0.50 $L_R$.

Item 28. The tolerance ring or assembly of any one of items 26 or 27, wherein $L_{LS}$ is no less than 0.20 $L_R$, such as no less than 0.25 $L_R$, no less than 0.30 $L_R$, no less than 0.35 $L_R$, no less than 0.40 $L_R$, or no less than 0.45 $L_R$.

Item 29. The tolerance ring or assembly of any one of items 4-28, wherein the ring has an axial length, $L_R$, and $L_{LS}$ is no greater than 0.95 $L_R$, such as no greater than 0.90 $L_R$, no greater than 0.85 $L_R$, no greater than 0.80 $L_R$, no greater than 0.75 $L_R$, no greater than 0.70 $L_R$, no greater than 0.65 $L_R$, or no greater than 0.60 $L_R$.

Item 30. The tolerance ring or assembly of item 29, wherein $L_{LS}$ is no less than 0.40 $L_R$, such as no less than 0.45 $L_R$, no less than 0.50 $L_R$, no less than 0.55 $L_R$, no less than 0.60 $L_R$, no less than 0.65 $L_R$, no less than 0.70 $L_R$, no less than 0.75 $L_R$, no less than 0.80 $L_R$, or no less than 0.85 $L_R$.

Item 31. The tolerance ring or assembly of any one of the preceding items, wherein there are a number of wave structures, $N_{WS}$, located peripherally around the ring, and wherein $N_{WS}$ is ≥3, such as $N_{WS}$ is no less than 4, no less than 5, no less than 6, no less than 7, no less than 8, no less than 9, no less than 10, no less than 11, no less than 12, no less than 13, no less than 14, no less than 15, or no less than 16.

Item 32. The tolerance ring or assembly of item 31, wherein $N_{WS}$ is no greater than 40, such as $N_{WS}$ is no greater than 35, no greater than 30, no greater than 25, no greater than 20, no greater than 15, or no greater than 10.

Item 33. The tolerance ring or assembly of any one of the preceding items, wherein each wave structure comprises a number of smaller wave structures, $N_{SWS}$, and wherein $N_{SWS}$ is ≥1, such as $N_{SWS}$ is no less than 2, no less than 3, or no less than 4.

Item 34. The tolerance ring or assembly of item 33, wherein $N_{SWS}$ is no greater than 6, such as $N_{SWS}$ no greater than 5, no greater than 4, or no greater than 3.

Item 35. The tolerance ring or assembly of any one of the preceding items, wherein the end section has an end face, and wherein the entirety of the end face is disconnected from the sidewall.

Item 36. The tolerance ring or assembly of any one of the preceding items, wherein $R_{WS}$ is no greater than 0.8 $R_B$, such as $R_{WS}$ no greater than 0.7 $R_B$, no greater than 0.6 $R_B$, no greater than 0.5 $R_B$, no greater than 0.4 $R_B$, no greater than 0.3 $R_B$, or no greater than 0.2 $R_B$.

Item 37. The tolerance ring or assembly according to any one of the preceding items, wherein the tolerance ring has a Vickers hardness HV of at least 50, such as at least 55, at least 60, at least 65, at least 70, at least 75, at least 80, at least 85, at least 90, at least 95, at least 100, at least 110, at least 115, at least 120, at least 125, at least 130, at least 135, at least 140, at least 145, at least 150, at least 160, at least 170, at least 180, at least 190, or at least 200.

Item 38. The tolerance ring or assembly according to any one of the preceding items, wherein the tolerance ring has a Vickers hardness HV of not greater than 600, such as not greater than 550, not greater than 400, not greater than 450, not greater than 400, not greater than 350, not greater than 300, or not greater than 250.

Item 39. An assembly, comprising: an inner component; an outer component; and a tolerance ring mounted between the inner component and the outer component, the tolerance ring including: a generally cylindrical body having a sidewall that defines a first axial end and a second axial end, wherein the sidewall includes: an undeformed portion; and a plurality of wave structures protruding from the undeformed portion, wherein a portion of each wave structure is disconnected from the undeformed portion, and wherein the tolerance ring is adapted to provide a slip torque, $T_{S1}$, wherein a tolerance ring devoid of disconnected wave structures has a slip torque, $T_{S2}$, and wherein a ratio of $T_{S1}:T_{S2}$ is not less than 1.01.

Item 40. The assembly of item 39, wherein the ratio of $T_{S1}:T_{S2}$ is not less than 1.05, not less than 1.10, not less than 1.15, not less than 1.20, no less than 1.25, or even not less than 1.30.

Item 41. The assembly of any one of items 39-40, wherein the ratio of $T_{S1}:T_{S2}$ is not greater than 1.50.

Item 42. A method of positioning a shaft relative to a bore, the method comprising: providing the tolerance ring of claim 1; locating a shaft to be positioned within a bore; positioning the tolerance ring radially external to the shaft; and engaging the bore with the tolerance ring, causing the end sections of the tolerance ring to deform radially inward and compress into the shaft disposed of there below.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination.

Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A tolerance ring comprising:
   a generally cylindrical body having a sidewall that defines a first axial end and a second axial end, wherein the sidewall includes:
   an undeformed portion; and
   a plurality of wave structures protruding from the undeformed portion,
   wherein each wave structure has a first axial end and a second axial end, wherein the first and second axial end of the wave structures are disconnected from the undeformed portion, wherein each wave structure has a first and a second longitudinal side, each longitudinal side having a total length, $L_{WS}$, and a disconnected length, $L_D$, defined by a disconnected length between the first and second longitudinal sides and the undeformed portion as measured from the respective axial end of the wave structure, and wherein $L_D$ is less than $0.2\, L_{WS}$.

2. The tolerance ring of claim 1, wherein a radius of curvature, $R_{WS}$, of at least one of the wave structures as measured at the first axial end, is less than a radius of curvature, $R_B$, of the body.

3. The tolerance ring of claim 2, wherein $R_{WS}$ is no greater than $0.8\, R_B$.

4. The tolerance ring of claim 1, further comprising a gap extending along the entire axial length of the body, wherein the gap establishes a split in the body.

5. The tolerance ring of claim 1, wherein the first and second longitudinal sides of at least one of the wave structure is at least partially disconnected from the undeformed portion along a length, $L_{D1}$, measured from the first axial end of the wave structure along $L_{WS}$, and wherein the first and second longitudinal sides of the at least one of the wave structures is at least partially disconnected from the undeformed portion along a length, $L_{D2}$, measured from the second axial end of the wave structure along $L_{WS}$.

6. The tolerance ring of claim 5, wherein $L_{D1}$ is no less than $0.01\, L_{WS}$.

7. The tolerance ring of claim 5, wherein $L_{D2}$ is no less than $0.01\, L_{WS}$.

8. The tolerance ring of claim 5, wherein $L_{D1}$ is equal to $L_{D2}$.

9. The tolerance ring of claim 1, wherein each wave structure comprises an arcuate wave body.

10. The tolerance ring of claim 1, wherein each wave structure comprises an outer apex with an apex radius, $R_E$, measured perpendicularly from a central axis of the ring to the outer surface of the apex, and a base radius, $R_B$, measured perpendicularly from the central axis of the ring to the outer surface of the undeformed portion, wherein $R_E$ is no less than $1.01\, R_B$ and wherein $R_E$ is no greater than $1.90\, R_B$.

11. The tolerance ring of claim 1, wherein a gap created by the disconnect between at least one of the wave structures and the undeformed portion extends continuously from the first longitudinal side of the at least one wave structure to the second longitudinal side of the at least one wave structure.

12. The tolerance ring of claim 1, wherein each wave structure comprises a first and second end face and wherein each end face comprises a tapered surface, the tapered surface having an angle, $A_S$, defined by the angle between the undeformed portion and the surface of the tapered face, wherein $A_S$ is no less than 20 degrees.

13. The tolerance ring of claim 1, wherein each wave structure has a first end face at the first axial end of the wave structure and a second end face at the second axial end of the wave structure, and wherein the entirety of the first and second end faces are disconnected from the undeformed portion.

14. The tolerance ring of claim 1, wherein the sidewall of the ring has a total axial length, $L_R$, measured from the first axial end of the sidewall to the second axial end of the sidewall, and wherein $L_{WS}$ is no greater than $L_R$.

15. The tolerance ring of claim 1, wherein the ring has an axial length, $L_R$, and $L_{WS}$ is no greater than $0.95\, L_R$.

16. The tolerance ring of claim 1, wherein each wave structure comprises a number of smaller wave structures, $N_{SWS}$, and wherein $N_{SWS}$ is no less than 2 and no greater than 6.

17. An assembly comprising:
an inner component;
an outer component; and
a tolerance ring mounted between the inner component and the outer component, the tolerance ring including:
    a generally cylindrical body having a sidewall that defines a first axial end and a second axial end, wherein the sidewall includes:
        an undeformed portion; and
        a plurality of wave structures protruding from the undeformed portion,
        wherein each wave structure has a first axial end and a second axial end, wherein the first and second axial ends of the wave structures are disconnected from the undeformed portion, wherein each wave structure has a first and a second longitudinal side, each longitudinal side having a total length, $L_{WS}$, and a disconnected length, $L_D$, defined by a disconnected length between the first and second longitudinal sides and the undeformed portion as measured from the axial end of the wave structure, and wherein $L_D$ is less than $0.2\, L_{WS}$.

18. The assembly of claim 17, wherein a gap created by the disconnect between at least one of the wave structures and the undeformed portion extends continuously from the first longitudinal side of the at least one wave structure to the second longitudinal side of the at least one wave structure.

19. The assembly of claim 17, wherein a radius of curvature, $R_{WS}$, of at least one of the wave structures as measured at the first axial end, is less than a radius of curvature, $R_B$, of the body.

20. A method of positioning a shaft relative to a bore, the method comprising:
providing a tolerance ring including:
    a generally cylindrical body having a sidewall that defines a first axial end and a second axial end, wherein the sidewall includes:
        an undeformed portion; and
        a plurality of wave structures protruding from the undeformed portion,
        wherein each wave structure has a first axial end and a second axial end, wherein the first and second axial ends of the wave structures are disconnected from the undeformed portion, wherein each wave structure has a first and a second longitudinal side, each longitudinal side having a total length, $L_{WS}$, and a disconnected length, $L_D$, defined by a disconnected length between the first and second longitudinal sides and the undeformed portion as measured from the axial end of the wave structure, and wherein $L_D$ is less than $0.2\, L_{WS}$;
locating a shaft to be positioned within a bore;
positioning the tolerance ring radially external to the shaft; and
engaging the bore with the tolerance ring, causing the end sections of the tolerance ring to deform radially inward and compress into the shaft.

* * * * *